Figure 3:
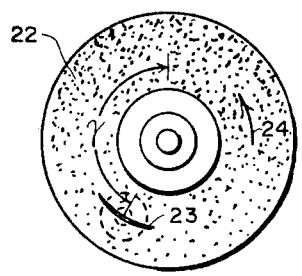

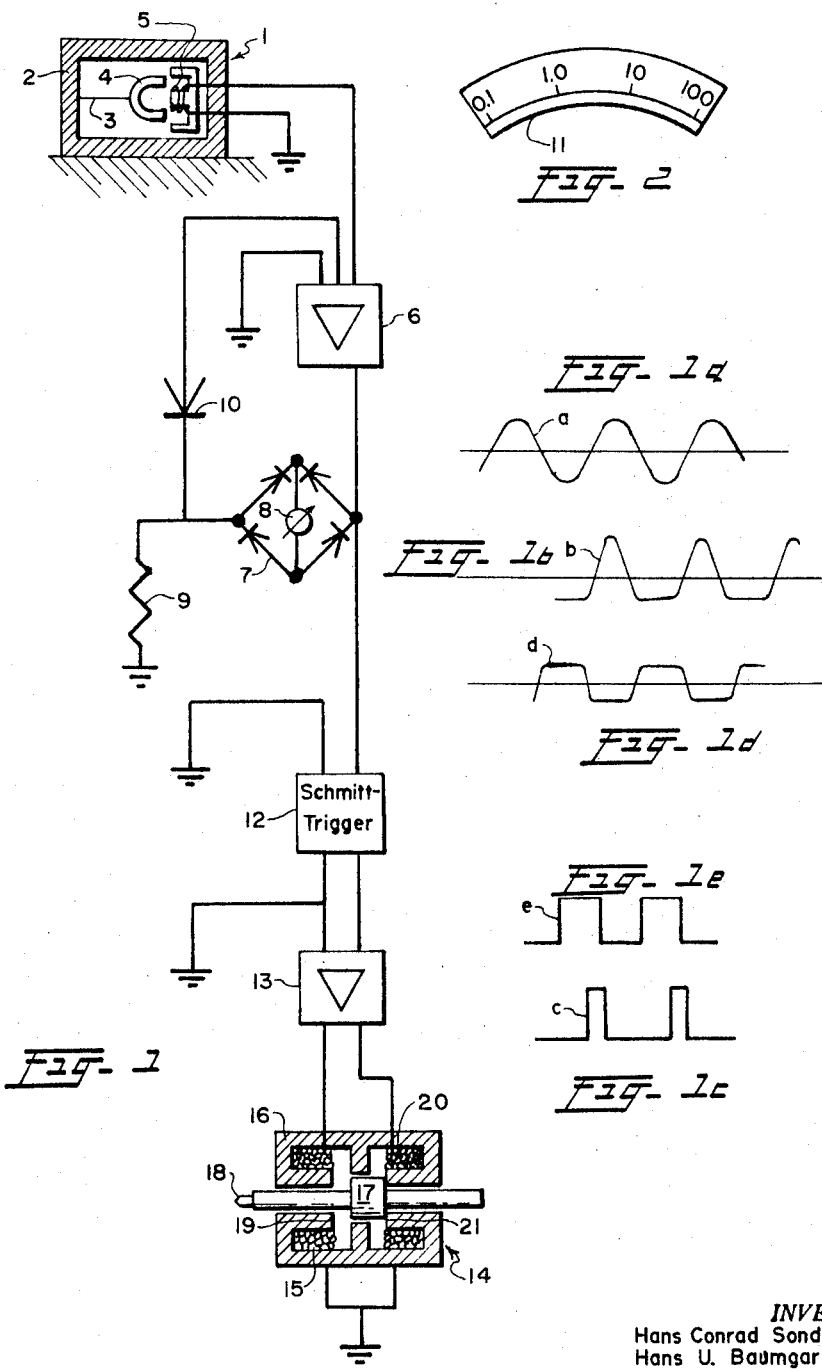

INVENTORS
Hans Conrad Sonderegger
Hans U. Baumgartner

BY Dicke + Craig
ATTORNEYS

United States Patent Office 3,273,293
Patented Sept. 20, 1966

3,273,293
DEVICE FOR BALANCING ROTATING BODIES DURING OPERATION
Hans Conrad Sonderegger, 26 Breitestrasse, and Hans U. Baumgartner, 90 Kurlistrasse, both of Winterthur, Switzerland
Filed June 13, 1963, Ser. No. 287,662
Claims priority, application Switzerland, June 18, 1962, 7,266/62; July 27, 1962, 9,076/62; Feb. 20, 1963, 2,232/63
15 Claims. (Cl. 51—262)

The invention relates to apparatus for balancing rotating bodies and especially for balancing grinding wheels during operation. For many machine tools with a rotating tool, and particularly with grinding machines, exact balancing of the rotating system is of great importance. In grinding machines an unbalanced grinding wheel will rotate in a noncircular manner and this is evident on the outer ground surface of the workpiece. For the finest and most uniform grinding, therefore, exact balancing of the grinding wheel is essential.

Grinding wheels may, however, become out of balance in use so that renewed balancing is necessary. To avoid the lack of balance, grinding machines are already known in this connection which embody built-in means for determining the lack of balance according to magnitude and phase position; with the machine stationary the lack of balance can be compensated in known manner by means of adjustable counterweights. This correcting procedure must be often repeated several times which results in objectionable interruption in operation.

Further grinding machines are also known which permit balancing during operation of the machine, although with comparative complication. For this purpose weights are adjusted within the flange of the grinding wheel until the lack of balance is eliminated; also complicated devices are known for automatic balancing in which such weights are automatically adjusted according to the lack of balance present.

The invention on the contrary permits balancing by comparatively simple means to be carried out on grinding wheels or other rotary bodies while in operation and by simple removal of material in a manner which does not affect the mechanical strength of the rotating body.

The invention is not, however, limited to the application to grinding machines, but is suitable for all types of machines which call for balancing of a rotary member, for example in those machines the rotor to be balanced is mounted on a specially supported shaft and set into rotation. Heretofore, the lack of balance was determined by known means as regards position and magnitude, according to the previous working method. By releasing the rotor and removing the excess material by drilling, the lack of balance is removed step by step until finally no lack of balance is indicated. This procedure requires several operations, and, moreover, involves considerable specialized knowledge as a result of which the whole operation is very expensive.

The apparatus according to the present invention is characterized by a subtracting tool as well as control means for periodically operating the tool at a frequency corresponding to the speed of the rotating body or a simple fraction thereof in such manner that for each working period of the tool material is removed over a part of the periphery of the rotating body in the sense which reduces the lack of balance.

In a particularly preferred embodiment of the invention the control means may embody a feeler responding to the out of balance or vibrations dependent thereon, which produce a periodic signal due to the lack of balance at a frequency corresponding to the speed of the rotating body. In this case conveniently the feeler may be in the form of a first converter with an electric output section and adapted to produce an electric signal which controls a second converter with an electric input member, the output member of which is coupled to the tool. The first converter may be constructed for example as a mechanical-electrical converter, while the second converter may be in the form of an electric-mechanical converter. Further, conveniently the feeler may co-operate with the bearing of the rotating body or may respond directly to the vibrations of the rotating body received by the machine frame or by the foundation structure.

In a preferred embodiment of the invention the feeler serving for producing the signal may be arranged either as an acceleration source or as a movement source. In some circumstances it may be advisable to associate with the feeler a vibratory system capable of being tuned which, on tuning to its natural frequency, is set into vibration at the speed of the rotating body and is set into vibration by the out of balance. The second converter controlled by the signal may conveniently be a vibratory magnet or may be constructed as a magneto-strictive converter.

Advantageously, further means are provided for amplifying the signals produced by the feeler, before these signals are utilized for the control purposes. Further means are conveniently provided for indicating the amplitude of the signals produced. These indicator means permit the magnitude of the unbalance or the effectiveness of the balancing operation, to be determined at any time.

Further, the control means and the tool advantageously form a self-contained built-in constructional unit and further operating means may be provided which bring the tool into engagement with the rotating body. In this case in a particularly convenient embodiment of the invention these operating means are controlled automatically dependently on a signal representing the magnitude of the unbalance in such manner that on exceeding a predetermined unbalance value, the tool is set into operation and that thereupon, after reducing the unbalance to a predetermined limit, the tool is again put out of operation.

In other cases on the other hand a particularly simple embodiment of the invention is obtained by the fact that the second converter is assembled to form a constructional unit with a removing tool which is guided by hand as a hand tool, dependently on the indications of the means representing the amplitude of the signal.

Further means may also be provided for shaping the signal produced by the feeler in such manner that the shaped signal used for controlling the tool imparts a predetermined timing to the operating movements of the tool suited to the particular operating conditions of the tool, the removal tool itself and/or the desired magnitude of the range of removal. In this connection, for example, means may be provided for converting the periodic signals of the feeler into a signal for controlling the tool, of approximately right-angular signal form. In this way the signal may advantageously control an electro-mechanical converter, with a solenoid winding for the feed and/or the return of an armature controlling the tool.

For a suitable shaping of the signal, a signal produced by the feeler may be amplified in an amplifier with a logarithmic characteristic, wherein for obtaining this characteristic a logarithmic element can be provided in a feed-back path of the amplifier, for example a logarithmic diode. The feed-back branch may then advantageously operate an indicating instrument for the average signal amplitude, by means of a rectifier.

In order to receive a particularly clear signal for controlling the tool, it is advisable under some circumstances to effect the cut off of this impulse by the zero transit of the signal produced by the feeler and conveniently suitably amplified. With rectangular pulses distortion of the input signal can be performed by means of a logarithmic amplifier dependently on the desired time period of the rectangular impulse. Finally, advantageously the response to the zero transit of an electrical signal is produced by means of a Schmitt trigger circuit.

Figure 4:
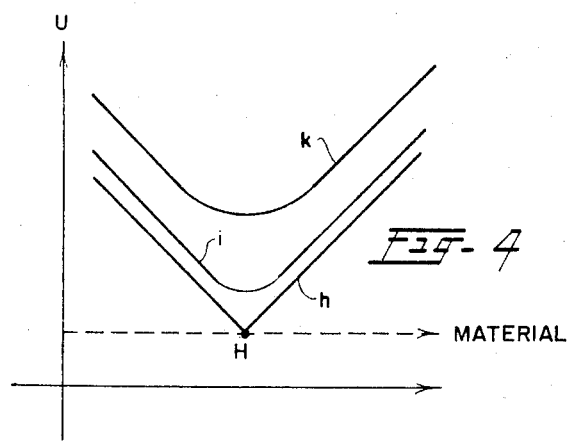
Figure 5:
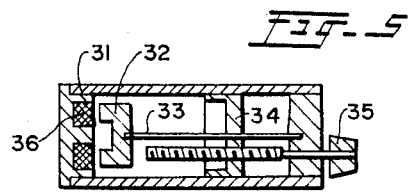

The invention and further associated features will be explained hereinafter on the basis of the constructional example shown in the accompanying drawings wherein:

FIG. 1 is a diagrammatic switch arrangement of a simplified balancing device wherein FIGS. 1a, 1b, 1c, 1d, and 1e show the form of signal at various points of the control system, FIG. 2 shows the scale of the indicating instrument shown in FIG. 1, FIGURE 3 is a view of a grinding wheel after the balancing operation has been carried out by the device of FIGURE 1, FIGURE 4 shows the relation between the material removed (abscissa) and the unbalanced magnitudes (ordinate), and FIGURE 5 shows an inductive source of vibration as a feeler.

Investigations have shown that other causes of vibrations are present besides lack of balance, for example ball bearings, magnetic forces in electric driving motors, non-concentric travel of a belt or of a shaft, etc. A piezoelectric feeler for example, would give a quite irregular signal composed of various components of different frequency, wherein, indeed, the main component can be caused by lack of balance and normally it is also the component with the lowest frequency. In order to obtain a clear control action for the tool, the beginning of the incision operation of the removal tool or the operation of a supplying tool is best dependent in many cases not on the amplitude of the feeler signal. It is then convenient to use the zero transit of the signal as the starting point, for example the transit from the positive phase to the negative phase or conversely.

With the falling unbalanced forces during the progress of the balancing operation, the unbalanced signal components of the lowest frequency fall off slowly while the stray signals from the said sources continue. With a weakening main signal additional zero transits may be produced by the remaining stray signals which may disturb the balancing operation. If the feeler were a piezo-electric device, additional zero transits then cause false tracks at the removal tool at points where no material should have been removed. Such false tracks are not not only unsightly but result in the fact that more material than absolutely necessary must be removed which further tends to wear the tool prematurely.

The disadvantages of a piezo-electric device, or the like device, can be largely overcome if the signal produced by the feeler shows clear zero transits even with a falling lack of balance and no additional zero transits are left as stray signals. This is the case with the feeler indicated on FIG. 5 which is in the form of an inductive source. This embodies a casing 31 in the bottom of which a tongue 33 carrying a permanent magnet 32 is firmly clamped. The natural frequency of the tongue, with the magnet can be adjusted by displacing the stem 34 by means of an adjusting screw 35. With the tongue vibrating the magnet 32 produces a voltage signal in the associated fixed induction coil 36, which is substantially of sine wave form.

In operation the natural frequency of the tongue with the magnet is tuned to the speed of the rotating body and in this case, with unbalance present, the stem 34 is adjusted until the maximum voltage appears in the inductor coil 36.

The feeler can be placed at any point of the machine to be balanced or of its foundation, except where it would be so fitted that it responds to the components of force due to the unbalance in the plane of the rotary axis of the rotary body and feeler. The feeler does not respond strictly speaking to a force but to an oscillation or vibration and this can be caused just as probably by another component or by various components of the unbalance forces. The feeler referred to responds selectively only to the unbalance signal, because of its tuning, which comprises practically exclusively the components having the rotary frequency of the rotating body, and all foreign influences are largely excluded.

FIG. 1 shows a switching device controlled by a feeler, similar to that shown in FIG. 5, for controlling a removal tool. The selective vibratory feeler consisting of the vibratory tongue 3 with a magnet 4 and the inductor coil 5 which can, for example, be fastened to the bearing housing of the rotating body, produces a good sine wave alternating voltage the wave form of which is indicated in FIG. 1a. This alternating voltage is initially amplified in a two-stage amplifier 6 and rectified in the bridge rectifier circuit 7. The direct current is indicated in the instrument 8. The output current from this preamplifier 6 flows, however, not directly to earth but partially through a logarithmic diode 10 in a feed back coupling. This logarithmic feed back coupling has the result that the instrument 8 does not have a linear indication but a logarithmic indication and consequently the calibration of the instrument should also be logarithmic as is indicated by the scale 11 in FIG. 2.

This arrangement has a very wide indicating range, in the region of three to four decades, and it can, without switching, be used for balancing machines having only slight vibration or machines with severe vibration. The logarithmic feed back coupling fulfills a further purpose. It changes the sine wave signal a according to FIG. 1a into a signal of the character of the signal b shown in FIG. 1b. The positive and negative excursions are not of the same magnitude and also not of the same time period. This modified signal is fed to a Schmitt trigger circuit 12 which responds to the zero transit and initiates a signal at each transit from negative to positive and is cut out again from positive to negative. The signal curve b shown in FIG. 1b is then converted into a rectangular waveform c as shown in FIG. 1c and, therefore, for about ⅔ of the time of one cycle the Schmitt trigger is cut off and only for ⅓ of the time of one revolution of the rotary body is the trigger circuit connected. In this time the output amplifier 13 is opened which then operates an actuator 14. In the actuator unit there is also located a magnet coil 15 which, as soon as the amplifier 13 feeds current, magnetizes the core 16 and the part 17 and the latter is attracted so that the tip 18 with the removal tool moves to the left, until part 17 engages stop 19. The return movement is effected for convenience by means of a second magnet coil 20 and core stop 21, which are operated by a special return feed signal.

If the balancing is already nearly complete the source 3, 4, 5 produces only a very weak signal and the distortion of the curve is no longer very great but there is then obtained in advance of the Schmitt trigger a signal curve somewhat similar to the curve d shown in FIG. 1d, which is then converted into a rectangular signal e, as shown in FIG. 1e, that is to say the magnet is connected for about half the period that is over 180° of each revolution. In that case in fact too much material is removed since the optimum removal extends only over an angle of about 120°. This is, however, largely unimportant especially in the case of fine balancing where broadly speaking not very much more material is to be removed. The advantage of the arrangement described lies in the easy handling, there are no switches to be operated. Therefore, it is impossible to incorrectly operate the apparatus. For this reason it is also possible for persons to use the apparatus who are unskilled in the handling of electro-technical apparatus.

For larger unbalance factors often considerable amounts of material are to be removed. There is the possibility that the balancing devices referred to may be used initially only to mark the position of the unbalance and then, for example, to remove material by the usual drilling operations or by adjusting weights so as to compensate the unbalance to a large extent. On the basis of the indicating instrument 11 in FIG. 2, it is then possible to check the magnitude of the result of this action. As soon as the relatively low level of unbalance is reached, a fine balancing action can then be effected according to the preceding examples.

FIG. 4 shows the relation between the material removed (abscissae) and unbalance values (ordinates). The curve $h$ is obtained if removal is effected exactly at the point of unbalance. The unbalance falls progressively and reaches a minimum in which there is still a residual signal from bearing vibration and other disturbing factors which are present. If this most favorable point H is exceeded imbalance is again obtained. If one does not operate at this most favorable phase position but more or less close thereto, the curves $i$ and $k$ are obtained, which show a minimum imbalance even if all the imbalance has not been eliminated. It is, therefore, necessary by careful checking to discover the point of correct removal and the incision operation must be often repeated. This is not the case with the automatic systems described above which are controlled by the unbalance signal itself. In these latter cases the imbalance is displaced—after incision is effected at an incorrect point—in such manner that finally the removal follows the curve $h$ so that in every case a complete balancing is effected. The advantage of the well defined incision must therefore in the present constructional example be reckoned with the disadvantage that the correct removal point must first be found.

FIGURE 3 shows a view of the grinding wheel as it appears after a balancing operation. The removal tool has produced a fine incision 23. The wheel 22 is shown in the position in which the center of the incision is aligned with the axis of the removal tool shown in dotted lines and this position is displaced from the location of the feeler by an angle $\gamma$. This is the angle between the vertical mid-plane through the feeler and the plane through the axis and the removal tool. The wheel rotates in the direction of the arrow 24.

At first, it would appear that the tool and the feeler should be located in one and the same plane through the axis of the shaft since the feeler produces its strongest signal when the unbalanced force passes through the vertical plane containing the converter and the rotary axis and hence the amount to be removed to eliminate the unbalance forces should pass through this plane at the same instant as the feeler. However, the whole control circuit—consisting of the feeler, the input and output amplifiers, and the converters—has such a time constant that, in the time interval between the unbalance signal and the maximum vibration amplitude at the tool, the wheel 22 has already moved through a path corresponding to the angle $\gamma$. For these reasons, the feeler converter and the removal tool are offset by the angle $\gamma$.

The angle $\gamma$ depends on the transmission ratios of the whole control circuit and on the speed of the rotating system and can be determined empirically in a simple way as follows. Allowing for the imbalance, the tool is placed at any angular position. If the unbalanced forces shown on the indicator 11 are increased, another angular position must be sought. The correct angular position is then attained when, on applying the tool, the indicator moves most rapidly in the direction of the minimum unbalanced force.

For machines with a fixedly installed removal device, the most favorable phase angle $\gamma$ can be varied in a continuous manner by electronic means within predetermined limits by varying the potentiometer at the amplifier 6.

From the foregoing, it will be seen at once that the electromechanical converter with the removal tool can also be constructed as a hand tool.

The invention is not limited to the constructional examples referred to. In particular any form of converter can be used for operating the tool, for example also converters with hydraulic or pnuematic inputs or outputs.

The invention is also not limited to a particular form of the body to be balanced; the most numerous possibilities of application are available both as a hand tool and also as a built-in constructional group, and particularly for power sources, production machines and treatment machines. The device according to the invention replaces to a particularly advantageous extent the previous balancing machines which determine the unbalance present as to magnitude and phase position, but in which the material for removing the imbalance must be effected in an additional operation. The device can also be so arranged that the body to be balanced—for example a turbine blade wheel—is clamped to a balancing machine embodying the device of the present invention. In any case, owing to the speed of the balancing operation and the possibility of carrying out the latter with rotating bodies in operation, outstanding advantages are obtained as compared with the usual arrangements and working methods, and in respect to which the invention is characterized by great simplicity.

Further application possibilities occur where it is more advantageous to use the signal from the feeler not on every revolution of the rotating body. Thus, for example, with electronic means in the pre-amplifier only every second, fifth or $n$th impulse can be fed onwards.

What is claimed is:
1. Device for dynamically balancing rotating bodies supported on a support structure, comprising:
   sensing means responsive to imbalance of the rotating body and capable of generating electric impulses,
   electromagnetic actuator means controlled by said electric impulses,
   tool means actuated by said actuator means at a frequency proportional to the speed of said rotating body, said tool means being operable to remove material from a portion of the contour of said rotating body at each operating cycle of said actuator means,
   said sensing means including a portable vibration feeler provided with adjustably tuned mechanical vibration means,
   said feeler being removably mounted on said support structure in the vicinity of said rotating body,
   said vibration means being tuned to the speed of said rotating body to produce by the imbalance a resonant condition and therewith generating said electric impulses as a periodic signal,
   said electromagnetic actuator means including at least one solenoid coil, an armature substantially coaxial with said solenoid coil, and at least one stop means limiting the advance of said armature which is effected by said electromagnetic actuator means upon energization thereof,
   and indicating and control means operatively connected with said feeler including recording means indicating said periodic signal with the amplitude thereof maximum upon tuning of said feeler, means for transforming said signal into a control signal of a substantially square wave characteristic, and means for adjusting the amplitude of said square wave signal to the operating characteristics of said solenoid coil and said armature in such a manner that said armature abuts against said stop means during the duration of said square wave signal.

2. Device according to claim 1, in which said actuator means is equipped with at least one of the two parts consisting of one solenoid coil and one stop for the advance and the withdrawal of said armature, respectively.

3. Device according to claim 2 having two of said solenoid coils, in which said two solenoid coils are coaxially disposed within said actuator means, and respective tubular magnetic inductor cores supporting said two solenoid coils.

4. Device according to claim 1, in which the actuator means is connected with the tool means to provide one unitary assembly which may be operated manually as a hand-operated tool in dependence on the recordings of said periodic signal at said recording means.

5. Device according to claim 1, in which the square wave impulse for the control of said solenoid coil is triggered by a zero passage of the signal generated by the feeler.

6. Device according to claim 5, further comprising zero responsive trigger circuit means for producing said zero response.

7. Device according to claim 1, in which said indicating and control means includes logarithmic amplifier means and means for varying, by the distortion of the input signal caused by the logarithmic amplification, the duration of the square wave impulse.

8. Device according to claim 7, in which said logarithmic amplifier means includes a logarithmic element in a degenerative branch of the amplifier means for obtaining the logarithmic characteristic of the amplifier.

9. Device according to claim 8, in which said logarithmic element is a logarithmic diode.

10. Apparatus according to claim 8, further comprising a linear recording means having a logarithmic scale, and a rectifier for operatively connecting said degenerative branch with said linear recording means for displaying the average signal amplitude.

11. Device according to claim 1, in which a phase modifier is provided for the adjustment of the phase angle between the periodic signal and the movements of the tool means.

12. Device according to claim 1, in which the feeler includes a reed, magnet means connected with said reed, and an inductor coil in spaced relationship with said magnet means, said reed being operable to vibrate at the resonance thereof with the beat of the vibrations generated by the imbalance of the rotating body so that said magnet means produces electrical voltages in said inductor coil.

13. Device according to claim 12, in which the magnet means includes a horse-shoe magnet, said inductor coil having an E-shaped core, the poles of the horse-shoe magnet at rest position being located between the legs and the center piece of the E-shaped core.

14. Device according to claim 12, in which said feeler further includes a carriage provided with a gap and said reed includes cooperating screw means, said reed being able to slide within said gap and be fastened in locking engagement with said carriage at all points along the length of the reed in such a manner that the length of the reed as well as its vibration frequency can be varied.

15. Device according to claim 3 in which the tubular magnetic inductor cores are rigidly and coaxially disposed within a housing means being provided with inwardly directed flux transmission means interposed between the two solenoid coils.

References Cited by the Examiner

UNITED STATES PATENTS

| | | | |
|---|---|---|---|
| 1,599,922 | 9/1926 | Rathbone | 73—473 |
| 2,078,796 | 4/1937 | Greentree | 73—457 |
| 2,171,927 | 9/1939 | Fuchs | 82—1 |
| 2,241,637 | 5/1941 | Ernst et al. | 73—458 |
| 2,731,887 | 1/1956 | Sjostrand | 82—911 |
| 2,946,218 | 7/1960 | Karpchuk | 73—462 |

FOREIGN PATENTS

| | | |
|---|---|---|
| 28,197 | 7/1956 | Finland. |
| 643,986 | 10/1950 | Great Britain. |
| 898,766 | 6/1962 | Great Britain. |

LESTER M. SWINGLE, *Primary Examiner.*

JAMES J. GILL, *Examiner.*